(12) United States Patent
Klonowski et al.

(10) Patent No.: US 12,252,261 B2
(45) Date of Patent: Mar. 18, 2025

(54) HYBRID PROPULSION UNIT FOR AN AIRCRAFT

(71) Applicant: SAFRAN HELICOPTER ENGINES, Bordes (FR)

(72) Inventors: Thomas Klonowski, Moissy-Cramayel (FR); Thomas Bruno Barraco, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 333 days.

(21) Appl. No.: 17/600,391

(22) PCT Filed: Mar. 30, 2020

(86) PCT No.: PCT/FR2020/000074
§ 371 (c)(1),
(2) Date: Sep. 30, 2021

(87) PCT Pub. No.: WO2020/201639
PCT Pub. Date: Oct. 8, 2020

(65) Prior Publication Data
US 2022/0177144 A1    Jun. 9, 2022

(30) Foreign Application Priority Data

Apr. 2, 2019   (FR) ..................................... 1903501

(51) Int. Cl.
*B64D 27/24*    (2024.01)
*B60L 53/20*    (2019.01)
(Continued)

(52) U.S. Cl.
CPC ............. *B64D 27/24* (2013.01); *B60L 53/20* (2019.02); *B64C 27/08* (2013.01); *F02B 61/00* (2013.01);
(Continued)

(58) Field of Classification Search
CPC ..... B64D 27/24; B64D 2221/00; B60L 53/20; B60L 2210/30; H02J 1/102; H02J 2310/44; Y02T 50/60; Y02T 10/70; Y02T 10/7072
See application file for complete search history.

(56) References Cited

U.S. PATENT DOCUMENTS 9,590,547 B2 * 3/2017 Lu ............................ H02H 7/12
2004/0112320 A1 * 6/2004 Bolz .................... H02J 7/1423
290/31
(Continued)

FOREIGN PATENT DOCUMENTS

EP    3085625 A1   10/2016
EP    3125343 A1    2/2017
(Continued)

OTHER PUBLICATIONS

Written Opinion of the International Searching Authority mailed Jul. 8, 2020, issued in corresponding International Application No. PCT/FR2020/000074, filed Mar. 30, 2020, 7 pages.
(Continued)

*Primary Examiner* — Bickey Dhakal
(74) *Attorney, Agent, or Firm* — Christensen O'Connor Johnson Kindness PLLC

(57) ABSTRACT

A hybrid propulsion unit for an aircraft with multi-rotor rotary wings includes an electrical generator driven by an internal combustion engine, a rectifier configured to convert an AC current sent by the electrical generator into DC current, a DC-AC converter, an electrical network connecting the rectifier to the converter and including a high-voltage DC current bus, electric motors powered by propeller converters coupled to the electric motors, electrical energy storage connected to the electrical network, the electrical
(Continued)

storage including at least one primary storage element and at least one secondary storage element.

18 Claims, 3 Drawing Sheets

(51) Int. Cl.
    *B64C 27/08* (2023.01)
    *B64D 27/02* (2006.01)
    *F02B 61/00* (2006.01)
    *H02J 1/10* (2006.01)
    *H02M 7/06* (2006.01)

(52) U.S. Cl.
    CPC ........... *H02J 1/102* (2013.01); *B60L 2200/10* (2013.01); *B60L 2210/30* (2013.01); *B64D 27/026* (2024.01); *B64D 2221/00* (2013.01); *H02J 2310/44* (2020.01); *H02M 7/06* (2013.01)

(56) References Cited

U.S. PATENT DOCUMENTS

| | | | | |
|---|---|---|---|---|
| 2006/0072352 | A1* | 4/2006 | Ghosh | H02M 1/4233 |
| | | | | 363/53 |
| 2010/0259205 | A1* | 10/2010 | Le Pecheur | H02P 1/26 |
| | | | | 318/400.3 |
| 2015/0222207 | A1* | 8/2015 | Matsushita | H02P 3/14 |
| | | | | 318/376 |
| 2015/0367950 | A1* | 12/2015 | Rajashekara | B64D 27/10 |
| | | | | 903/930 |
| 2017/0137139 | A1 | 3/2017 | Connaulte | |
| 2017/0225573 | A1 | 8/2017 | Waltner | |
| 2020/0115062 | A1 | 4/2020 | Klonowski et al. | |
| 2020/0180454 | A1* | 6/2020 | Gao | H02J 1/14 |

FOREIGN PATENT DOCUMENTS

| | | | | |
|---|---|---|---|---|
| EP | 3296212 | A1 * | 3/2018 | B61C 5/00 |
| FR | 3056555 | A1 | 3/2018 | |
| JP | 2019534821 | A * | 12/2019 | |
| RU | 2481676 | C1 * | 5/2013 | |

OTHER PUBLICATIONS

Preliminary International Report on Patentability mailed Sep. 28, 2021, issued in corresponding International Application No. PCT/FR2020/000074, filed Mar. 30, 2020, 1 page.

International Search Report mailed Jul. 8, 2020, issued in corresponding International Application No. PCT/FR2020/000074, filed Mar. 30, 2020, 2 pages.

Written Opinion of the International Searching Authority mailed Jul. 8, 2020, issued in corresponding International Application No. PCT/FR2020/000074, filed Mar. 30, 2020, 6 pages.

* cited by examiner

HYBRID PROPULSION UNIT FOR AN AIRCRAFT

CROSS-REFERENCES TO RELATED APPLICATIONS

This application is a National Stage of International Application No. PCT/FR2020/000074, filed Mar. 30, 2020, which claims priority to French Patent Application No. 1903501, filed Apr. 2, 2019, the entire disclosures of which are hereby incorporated by reference in their entirety.

TECHNICAL FIELD

Embodiments of the present disclosure relate to a hybrid propulsion unit for an aircraft with multi-rotor rotary wing, and to an aircraft comprising such a hybrid propulsion unit.

BACKGROUND

The prior art comprises in particular the documents EP-A1-3 085 625, EP-A1-3 296 212, FR-A1-3 056 555, EP-A1-3 123 343 and US-A1-2017/225573.

It is known from the prior art a hybrid propulsion unit of an aircraft, commonly called series hybridization, with a thermoelectric power generation.

As shown in FIG. 1, a hybrid propulsion unit 10 typically comprises:
- an internal combustion engine 12;
- an electric generator 14 coupled to the internal combustion engine so that in operation the internal combustion engine 12 drives the electric generator 14;
- a rectifier 16 connected to the electric generator 14 and configured to convert an alternative current delivered by the electric generator 14 into a direct current;
- means 18a, 18b, 18c, 18d for converting the direct current into alternative current;
- an electrical network 20 connecting the rectifier 16 to the conversion means 18a, 18b, 18c, 18d;
- electric motors 22a, 22b, 22c, 22d connected to the conversion means 18a, 18b, 18c, 18d so that in operation the conversion means 18a, 18b, 18c, 18d supply the electric motors 22a, 22b, 22c, 22d with alternative current; and
- propellers 24a, 24b, 24c, 24d coupled to the electric motors 22a, 22b, 22c, 22d so that in operation the electric motors 22a, 22b, 22c, 22d drive the propellers 24a, 24b, 24c, 24d.

In addition, the electrical network 20 typically comprises a high voltage direct current (HVDC) bus.

In such an architecture, from a source of fossil fuel, the internal combustion engine 12, and via a mechanical-electrical conversion, by the electric generator 14, an electrical propulsion chain 25a, 25b, 25c, 25d composed of the conversion means 18a, 18b, 18c, 18d, the electric motors 22a, 22b, 22c, 22d and the propellers 24a, 24b, 24c, 24d allows to make fly an aircraft with rotating multi-wings.

An aircraft comprising such a hybrid propulsion unit is multi-rotor, which allows to provide additional degrees of freedom, compared to the conventional aircrafts, with respect to the controllability of the aircraft, for example the braking, the avoidance strategy, the change of direction, or the tilting of the rotors.

For an application in a vertical take-off and landing (VTOL) aircraft, or for an application in a conventional take-off and landing (CTOL) aircraft, i.e., on a runway, the unit 10 generally comprises a storage unit 26 that has a function of reserve of the electrical energy required for an emergency landing mode or for completing a particular mission. The storage unit 26 allows to ensure a redundancy in the supply of electrical energy in the event that a turbine generator becomes inoperative. In addition, the storage unit 26 can be used to stabilize the voltage of the HVDC bus, and thus maintain the controllability of the propellers.

The storage unit 26 comprises one or a plurality of secondary storage elements on the HVDC bus. A secondary storage element is a rechargeable storage element. A secondary storage element may be an electrochemical battery, for example a Li-Ion or Nickel Metal Hydride (NiMH) battery, or a super capacitor, or a hybrid capacitor.

The secondary storage element requires a Battery Management System (BMS).

A BMS is a complex piece of equipment that comprises power switching devices and uses electronics to monitor the state of charge, the operating parameters and the health of the secondary storage element.

However, such a unit has a significant on-board mass, and it is necessary to ensure a management of the electrical risks in the particular context of the on-board aeronautical environment.

Indeed, this unit must necessarily integrate electrical equipment, which is heavy and imposing, to allow a good regulation of the HVDC bus of the electrical network 20 and a good stability.

The storage unit 26, and more specifically the secondary storage element, represents a significant mass of the unit 10. In addition, regardless of the technology of the secondary storage element, the BMS increases the mass of the unit by about 30%, and also increases its probability of failure.

The known secondary storage elements have a non-negligible self-discharge rate, which makes periodic recharging of these storage elements mandatory and therefore requires the presence of a charger, either on board the aircraft or in the ground infrastructure.

In addition, the secondary storage elements degrade over time, even when they are rarely used. These storage elements must therefore be tested and replaced periodically.

For the VTOL and CTOL applications, these storage elements must always be active. Thus, the unit can supply electrical energy to these storage elements at any time, in undesired cases such as the short circuits, harmful to both the storage elements and the HVDC electrical network. These storage elements can also be discharged prematurely by a leakage current phenomenon.

Such storage elements are generally not resistant to severe environments, such as cold and hot temperatures, as well as to mechanical stresses, such as vibrations or shocks. To meet these environmental constraints, these secondary storage elements must be sized accordingly, which results in an increase in the mass of the storage unit to be carried on board the aircraft.

In addition, for some secondary storage element technologies, these storage elements can become hazardous in the event of thermal runaway. A thermal runaway can in particular be caused by external or internal short circuits in these storage elements, by their overloading, or by other causes, in particular environmental ones.

The coupling of a secondary storage element to the electrical network can be problematic due to the interactions between an electrical network, whose voltage can vary at any time, and a secondary battery whose voltage is a function of the state of charge. Thus, precautions must be taken to avoid any electrical risk or even any risk of operational availability of the storage element. These precautions make the system more complex.

The purpose of the invention is to propose a solution allowing to remedy at least some of these disadvantages.

SUMMARY

To this end, the disclosure relates to a hybrid propulsion unit for an aircraft with multi-rotor rotary wing, comprising:
an internal combustion engine;
an electric generator coupled to the internal combustion engine so that in operation the internal combustion engine drives the electric generator; a rectifier connected to the electric generator and configured to convert an alternative current delivered by the electric generator into a direct current,
means for converting direct current into alternative current;
an electrical network connecting the rectifier to the conversion means, the electrical network comprising a high voltage direct current bus;
electric motors connected to the conversion means so that in operation the conversion means supply the electric motors with alternative current; and
propellers coupled to the electric motors so that in operation the electric motors drive the propellers,
wherein the unit comprises electrical energy storage means connected to the electrical network, the storage means comprising at least one primary storage element and at least one secondary storage element and in that the at least one primary storage element is connected in series with the electrical network, and the at least one secondary storage element is connected in parallel with the electrical network.

The storage means are said to be hybrid, since they comprise both a primary storage element, and therefore non-rechargeable, and at least one secondary storage element, and therefore rechargeable.

In the event that a turbine generator becomes inoperative, a hybrid propulsion unit will require subsequent a maintenance operation of the entire propulsion system.

According to the disclosure, the storage means comprise a primary storage element, which can either be used once and then replaced during the maintenance of the engine for high power and energy requirements, or reusable for stabilization requirements of the voltage of the HVDC bus requiring low level energy storage.

A primary storage element is not rechargeable, i.e., this storage element is single shot. A primary storage element is designed to produce an electric current by an electrochemical reaction that is not reversible. This storage element cannot be recharged by an electric current when discharged.

Therefore, since a maintenance is required if a turbine generator becomes inoperative, incorporating a non-rechargeable storage element will not penalize the system in terms of mass, and there will be no need for a stock of primary storage elements on the aircraft, since these latter will be replaced following the maintenance operation.

This unit allows to realize the degraded mode for an emergency landing from a loss of a main power generation source. Indeed, this unit comprises the technology of the storage elements that convey the electrical energy necessary to lift the aircraft.

In the unit according to the disclosure, there is advantageously no need for BMS or electronic conversion system downstream of the storage means allowing to adapt the voltage of the storage means to the HVDC bus voltage. This allows to simplify the unit and to reduce the overall weight of the architecture.

In addition, the primary storage element has no self-discharge, and therefore does not require recharging, and does not suffer any temporal degradation. This storage element has a good resistance to severe environments, for example above 150° C., as well as to mechanical stresses. In addition, the primary storage element does not present any risk of thermal runaway.

The hybrid propulsion unit according to the disclosure allows to ensure a redundancy in the supply of electrical energy, stabilizes the voltage of the HVDC bus, and thus maintains the controllability of the electrical propulsion chains.

Thus, it allows to carry out the emergency landing functions.

This unit also allows to minimize the electrical constraints and the impacts on the on-board electrical network of the aircraft and on the power network, in terms of generation, distribution, battery, and electromagnetic compatibility (EMC) issues.

Furthermore, the unit according to the disclosure has a lower mass and volume than the architectures according to the prior art, and uses totally secure storage means, without being associated with a complex BMS, as in the architectures according to the prior art.

The unit according to the disclosure may comprise a contactor, referred to as second contactor, arranged in parallel with the primary storage element. This contactor allows to control the activation and the deactivation of the primary storage element.

Since the electrical energy required for an emergency is delivered by the primary storage element and the electrical network, the primary storage element can advantageously be undersized in terms of power and energy to be delivered.

Thus, in this embodiment, the emergency supply voltage is optimally dimensioned, this voltage being the sum of the voltage delivered by the primary storage element and the output voltage of the rectifier. This allows to minimize the intensity of the current flowing in the electrical network.

The primary storage element may be sized to provide a voltage lower than the voltage level generated in the first embodiment. This advantageously allows to reduce the mass and the overall size of the storage means.

The unit may also comprise a contactor, referred to as third contactor, arranged in parallel with the electric generator. This contactor allows to decouple the rectifier from the primary storage element, so that only the primary storage element provides electrical energy to the various electrical propulsion chains.

A contactor can be of the electromechanical or static type.

The unit may also comprise a diode arranged in series with the primary storage element. Advantageously, the diode allows to prevent current from being fed back to the terminals of the rectifier if the voltage level of the primary storage element is or becomes higher than the rectifier output voltage.

Filtering means can be arranged upstream of the rectifier in order to comply with the requirements of electrical network stability.

The primary storage element may be formed by a plurality of electrochemical couples arranged in series.

According to an embodiment, the primary storage element is formed by at least one ignited electrochemical couple. In other words, the primary storage element may comprise one or a plurality of "ready to use" electrochemical couples, i.e., with the electrolyte wetting the anode and the cathode. Advantageously, these primary electrochemical couples are efficient, have a low self-discharge, and do not undergo any temporal degradation. In addition, the use of such primary storage elements allows to eliminate the BMS.

According to another embodiment, the primary storage element is formed by at least one ignitable electrochemical couple. In other words, the primary storage element may comprise one or a plurality of "inert" electrochemical couples, i.e., the electrolyte of which does not wet the anode and the cathode.

The primary storage element may be formed by at least one thermally ignitable electrochemical couple.

Advantageously, such electrochemical couples are electrically and chemically inert when not activated.

These inert electrochemical couples have no self-discharge, and therefore do not require a charger to recharge them. Moreover, these electrochemical couples are not subject to any temporal degradation, and can be guaranteed between 15 and 20 years. Moreover, the use of such electrochemical couples allows the suppression of the BMS.

Moreover, these electrochemical couples do not present any electrical danger or risk of accidental discharge, since they are electrically inert.

These couples have a good resistance to severe environmental conditions, in particular above 150° C., since they are chemically inert.

Moreover, these couples do not present any risk of thermal runaway in the inert state.

Since these couples are in an inactive state, the insulation resistance between the positive and negative polarities of these pairs is high, which allows the primary storage element to be installed in an electrical unit without any prior precautions.

In particular, the coupling of an electrically inert storage element to the electrical network can be easily done by paralleling, in which case the storage element is in the insulating state, or by series connection, for example with a diode, in which case the storage element is in the zero voltage state.

Preferably, the secondary storage element comprises one or a plurality of super capacitors.

Such a secondary storage element is advantageously simple to install on the electrical network and light in terms of mass.

The secondary storage element is used to stabilize the voltage of the HVDC bus. As the secondary storage element is rechargeable, this allows a stabilization over a frequency range from Hz to kHz. The secondary storage element advantageously has a high power density by mass, without necessarily having an energy density intermediate between a conventional electrolytic capacitor and a battery.

The disclosure also relates to an aircraft with multi-rotors rotary wing, comprising a hybrid propulsion unit according to the disclosure.

DESCRIPTION OF THE DRAWINGS

The disclosure will be better understood and other details, characteristics and advantages of the present disclosure will become clearer from the following description made by way of non-limiting example and with reference to the attached drawings, in which.

The elements having the same functions in the different embodiments have the same references in the FIGURES.

DETAILED DESCRIPTION

Figure 1:
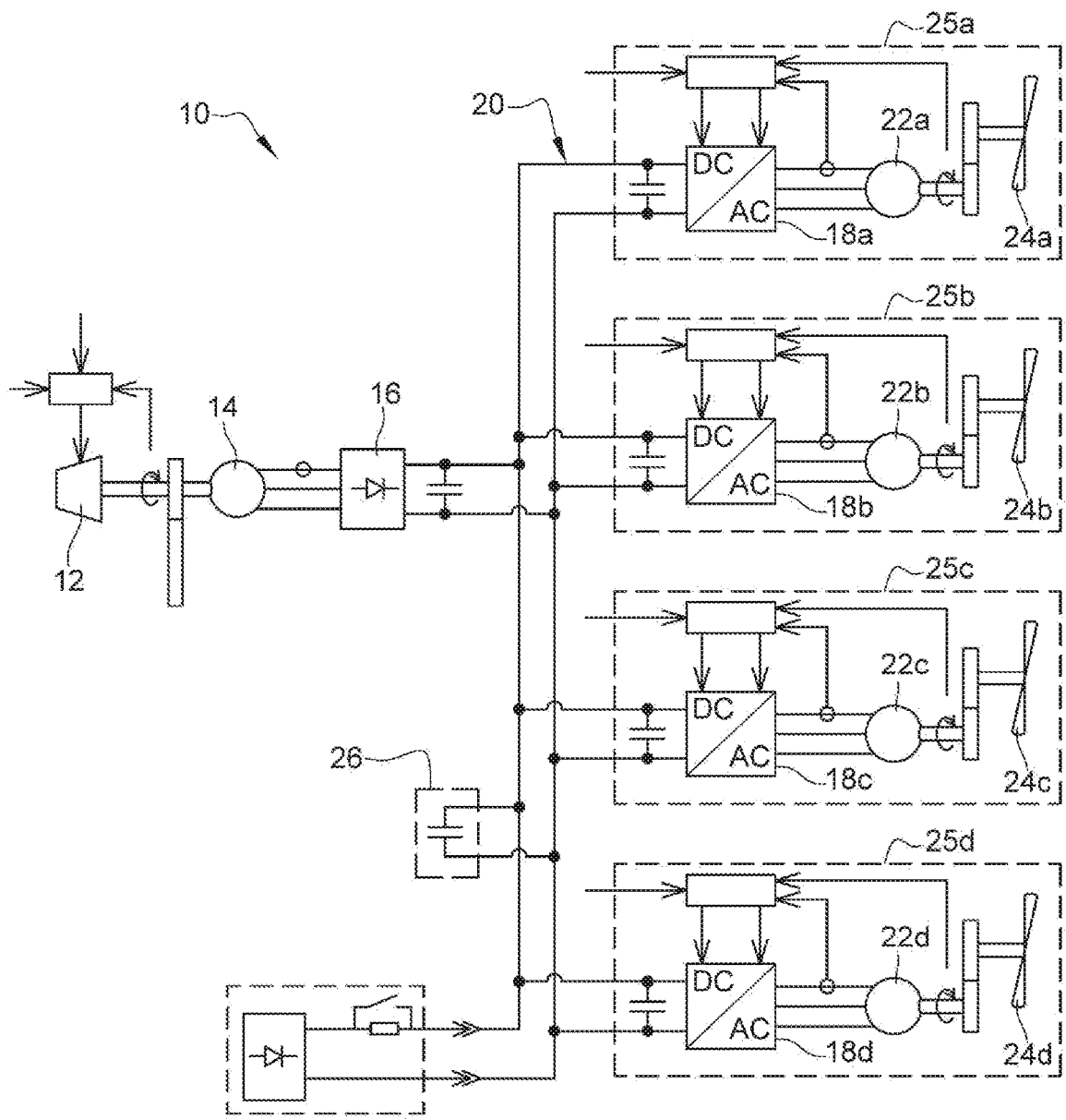
FIG. 1 shows a hybrid propulsion unit of an aircraft according to the prior art.
Figure 2:
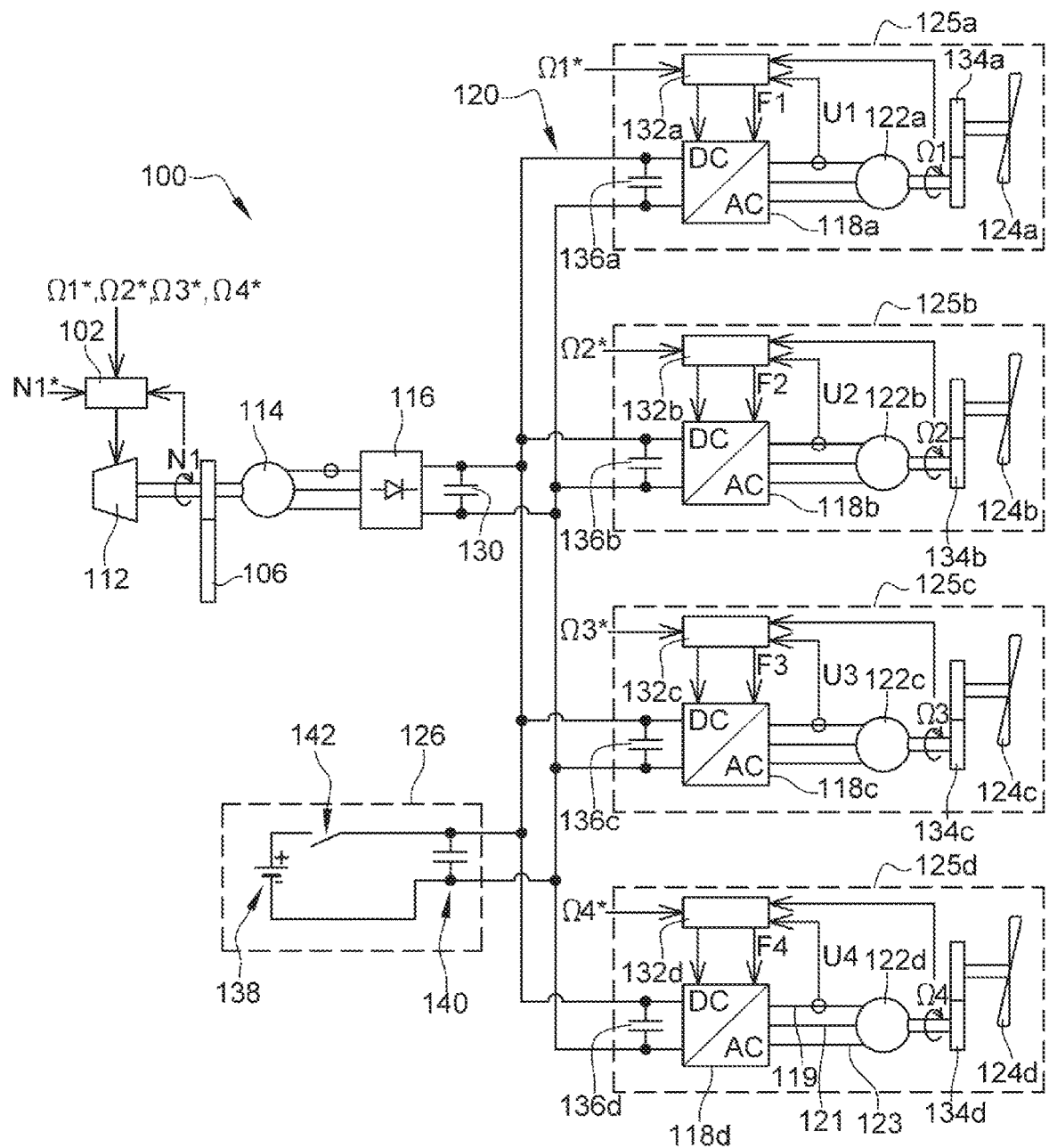
FIG. 2 shows a hybrid propulsion unit of an aircraft according to a first embodiment of the disclosure.
Figure 3:
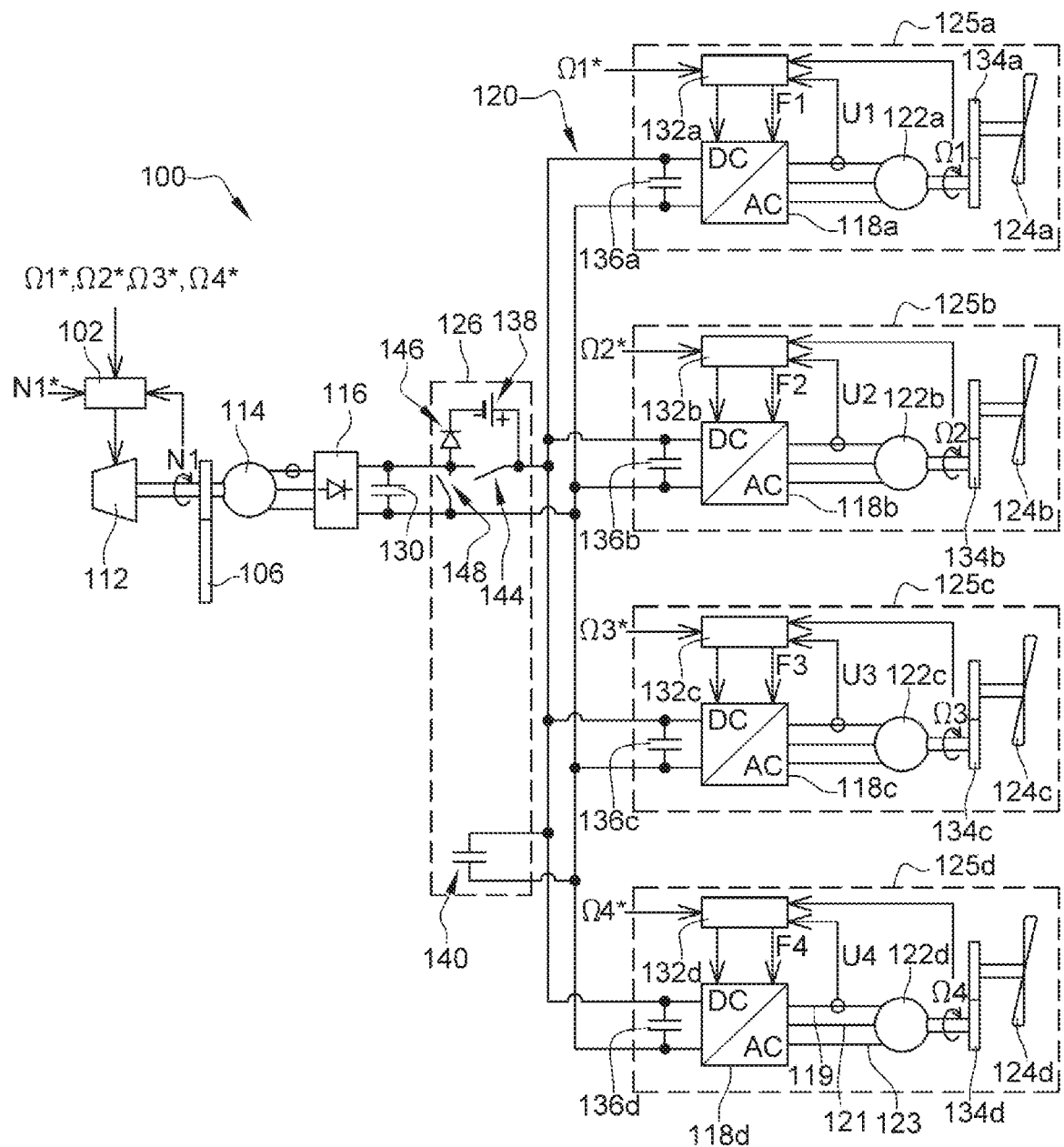
FIG. 3 shows a hybrid propulsion unit of an aircraft according to a second embodiment of the disclosure.

FIGS. 2 and 3 show a hybrid propulsion unit 100 of an aircraft, for example of the helicopter or airplane type, with multi-rotor rotary wing according to the disclosure. For example, the unit 100 can be integrated into an aircraft weighing less than 5000 kg, with an on-board mechanical power of between 50 kW and 2000 kW.

An internal combustion engine 112, such as a turbomachine, for example an Auxiliary Power Unit (APU), is coupled to an electric generator 114. In operation, the electric generator 114 is driven by the engine 112.

The electric generator 114 may be a motor-generator, i.e., it may be capable of operating in both generator mode and motor mode. In other words, the electric generator 114 may operate in generator mode, in particular as when driven by the engine 112, or in a motor mode. The electric generator 114 may be a synchronous or asynchronous electrical machine. Thus, the electric generator 114 may be a reversible electrical machine. The electric generator 114 allows to provide a bidirectional mechanical-to-electrical energy conversion, i.e., a mechanical-to-electrical conversion and an electrical-to-mechanical conversion. The electric generator 114 may generate a polyphase electrical current, for example a three-phase current as shown in FIGS. 2 and 3.

The engine 112 and the electric generator 114 provide a primary source of generation for the unit 100. Although a single main generation source is shown in FIGS. 2 and 3, the unit 100 may comprise a plurality of main generation sources.

The rotational speed N1 of the shaft of the rotor of the engine 112 connected to the electric generator 114 can be controlled by control means 102 (EECU, Electronic Engine Control Unit). These control means 102 may control parameters of the engine 112, such as the fuel weight flow, noted WF, on the basis of the rotation speed N1 and other parameters, such as the frequency N1* of the electric generator 114 or an anticipation of the load Ω1*, Ω2*, Ω3*, Ω4* for each electrical propulsion chain.

An auxiliary gearbox 106 may be arranged between the engine 112 and the electric generator 114.

A rectifier 116 is connected to an input to the electric generator 114 and configured to convert the alternative current delivered by the electric generator 114 into a direct current. The rectifier 116 may be current reversible. A capacitive element 130, such as a capacitor, may be arranged in parallel with the electric generator 114.

An electrical network 120 connects in parallel an output of the rectifier 116 to inputs of conversion means 118a, 118b, 118c, 118d.

The conversion means 118a, 118b, 118c, 118d are configured to convert a direct current into an alternative current. The conversion means 118a, 118b, 118c, 118d may comprise direct current to alternative current converters.

The conversion means 118a, 118b, 118c, 118d may comprise inverters. In FIGS. 2 and 3, DC means direct current and AC means alternative current. Each inverter may comprise three inverter arms respectively delivering the three phases 119, 121, 123 (referenced only for the conversion means 118d) of alternative current to each of the electric motors 122a, 122b, 122c, 122d.

The conversion means 118a, 118b, 118c, 118d, and in particular the inverters, may be current reversible. A capacitive element 136a, 136b, 136c, 136d, for example a capacitor, may be arranged in parallel with each of the conversion means 118a, 118b, 118c, 118d.

The electrical network 120 may be bidirectional, that is, the electrical current may flow from the rectifier 116 to the conversion means 118a, 118b, 118c, 118d, and in the opposite direction.

Electric motors 122a, 122b, 122c, 122d are connected to the conversion means 118a, 118b, 118c, 118d. In operation, the electric motors 122a, 122b, 122c, 122d are supplied with alternative current by the conversion means 118a, 118b, 118c, 118d.

The electric motors 122a, 122b, 122c, 122d may be polyphase synchronous motors. These motors can be of different types, such as induction motors or variable reluctance motors. These motors can be of the single-stator or multi-rotor type. This advantageously allows to reduce the mass and the volume of the electric motors 122a, 122b, 122c. 122d.

The connection between the electric generator 114 and the electric motors 122a, 122b, 122c, 122d is operated in direct current, at a relatively high voltage, so as to improve the stability of the electrical network 120 and the power management. The rectifier 116 thus allows to ensure the conversion of the alternative current delivered by the electric generator 120 into direct current, while the conversion means 118a, 118b, 118c, 118d ensure the conversion of this direct current into alternative current intended for the electric motors 122a, 122b, 122c, 122d.

Propellers 124a, 124b, 124c, 124d are coupled to the electric motors 122a, 122b, 122c, 122d. In operation, the propellers 124a, 124b, 124c, 124d are driven by the electric motors 122a, 122b, 122c, 122d. The propellers 124a, 124b, 124c, 124d may be coaxial counter-rotating propellers.

In particular, the conversion means 118a, respectively 118b, 118c, 118d, the electric motor 122a, respectively 122b, 122c, 122d, and the propeller or the propellers 124a, respectively 1246, 124c, 124d, form an electrical propulsion chain 125a, respectively 125b, 125c, 125d. In FIGS. 2 and 3, there are therefore four electrical propulsion chains 125a, 125b, 125c, 125d.

For each electrical propulsion chain 125a, 125b, 125c, 125d, the rotational speed $\Omega1$, $\Omega2$, $\Omega3$, $\Omega4$ of the shaft connecting the electric motor 122a, 122b, 122c, 122d and the propellers 124a, 124b, 124c, 124d, via a gearbox 134a, 134b, 134c, 134d, can be controlled by control means 132a, 132b, 132c, 132d. Similarly, the voltage U1, U2, U3, U4 from the conversion means 118a, 118b, 118c, 118d for supplying each electric motor 122a, 122b, 122c, 122d can be controlled by control means 132a, 132b, 132c, 132d. These control means 132a, 132b, 132c, 132d may control parameters of the conversion means 118a, 118b, 118c, 118d, such as the voltage U1, U2, U3, U4 of the electric motors 122a, 122b, 122c, 122d and the machine frequency F1, F2, F3, F4 based on the rotational speed $\Omega1$, $\Omega2$, $\Omega3$, $\Omega4$ and the voltage U1, U2, U3, U4 of the electric motors 122a, 122b, 122c, 122d, and other parameters, such as the load anticipation $\Omega1^*$, $\Omega2^*$, $\Omega3^*$, $\Omega4^*$.

Storage means 126 are connected to the electrical network 120. These storage means 126 allow to absorb an excess of electrical energy from the HVDC bus of the electrical network 120. The storage means 126 may also be configured to temporarily supply the electric motors 122a, 122b, 122c, 122d by supplementing or substituting the electric generator 114.

The storage means 126 comprises one or a plurality of primary storage elements 138 and one or a plurality of secondary storage elements 140.

A secondary storage element 140 may comprise one or a plurality of batteries, one or a plurality of capacitors, or one or a plurality of supercapacitors.

A primary storage element 138 may be formed by one or a plurality of electrochemical couples. The plurality of electrochemical couples may be arranged in series, in parallel, or in series-parallel, i.e., some electrochemical couples may be arranged in series, and this series of electrochemical couples is arranged in parallel to another series of electrochemical couples or to another electrochemical couple.

A primary storage element 138 may be formed by one or more ignited electrochemical couples. These ignited electrochemical couples are said "ready to use", since the electrolyte wets the anode and the cathode. The primary storage element 138 may be a battery.

A primary storage element 138 may be formed by one or more ignitable electrochemical couples. These ignitable electrochemical couples are said "inert", since the electrolyte does not wet the anode and the cathode.

The primary storage element 138 may be a separate electrolyte battery. Specifically, the electrolyte is arranged in a reservoir adjacent to the area containing the anode and the cathode, and is released only upon the activation of the primary storage element so that it comes into contact with both the anode and the cathode.

The electrochemical couples can be thermally ignitable. The primary storage element 138 may then be a thermal battery. Specifically, the electrolyte is solid at room temperature, and is heated upon the activation of the primary storage element. The electrolyte quickly liquefies and then comes into contact with both the anode and the cathode.

These couples have the advantage of being electrically and chemically "inert" when not activated.

In FIGS. 2 and 3, the primary storage element 138 is shown as a battery, with + indicating the positive terminal and − indicating the negative terminal of the battery.

According to a first embodiment shown in FIG. 2, the primary storage element 138 is arranged in parallel with the secondary storage element 140. The hybrid storage means 126 are then connected in parallel to the electrical network 120.

The primary storage element 138 may be activated in case of emergency in a variety of ways, for example by a pyrotechnic activation, or by an electrical activation.

A contactor 142, referred to as first contactor, may be arranged between the primary storage element 138 and the secondary storage element 140 so as to be able to disconnect the primary storage element 138 when activated.

Since no precautions need to be taken in connecting the primary storage element 138 to the electrical network 120 in the case of an inert electrochemical couple, the first contactor 142 may be optional.

According to a second embodiment shown in FIG. 3, the primary storage element 138 is connected in series with the electrical network 120. Specifically, the primary storage element 138 is connected in series with the motor 112 and with the electric generator 114. The secondary storage element 140 is connected in parallel to the electrical network 120.

A contactor 144, referred to as second contactor, may be arranged in parallel with the primary storage element 138 so that the primary storage element 138 may be added in series with the motor 112 and with the electric generator 114.

When the primary storage element 138 is activated, it is in series with the electrical network 120 associated with the rectifier 116.

The electrical energy required for an emergency event is delivered by the primary storage element 138 and the electrical network 120, which allows the primary storage element 138 to be undersized in terms of power and energy to be delivered. The rectifier 116 can then be sized to accept the resulting voltage and allow the full amount of the electrical power to be transmitted in case of emergency.

A diode 146 may be arranged in series with the primary storage element 138 so as to prevent any current feedback across the terminals of the rectifier 116 if the voltage level of the primary storage element 138 is or becomes higher than the rectifier output voltage 116.

Filtering means (not shown) may be arranged upstream of the rectifier 116.

A contactor 148, referred to as third contactor, may be arranged in parallel with the electric generator 114.

The first embodiment is advantageously more autonomous than the second embodiment in terms of main generation. Thus, in the second embodiment, the main generation may be decoupled and only the primary storage element 138 then supplies the electrical energy to the various electrical propulsion chains 125a, 125b, 125c, 125d, by closing the contactor 148. The rectifier 116 may then no longer conduct current on the HVDC bus.

The contactors 142, 144, 148 can be of the electromechanical or static type.

The invention claimed is:

1. A hybrid propulsion unit for an aircraft with multi-rotor rotary wing, comprising:
   an internal combustion engine;
   an electric generator coupled to the internal combustion engine such that in operation the internal combustion engine drives the electric generator;
   a rectifier connected to the electric generator and configured to convert an alternative current delivered by the electric generator into a direct current;
   means for converting direct current into alternative current;
   an electrical network connecting the rectifier to the conversion means, the electrical network comprising a high voltage direct current bus;
   electric motors connected to the conversion means so that in operation the conversion means supply the electric motors with alternative current;
   propellers coupled to the electric motors so that in operation the electric motors drive the propellers;
   electrical energy storage means connected to the electrical network, said storage means comprising at least one primary storage element and at least one secondary storage element, and wherein said at least one primary storage element is connected in series with the electrical network, and said at least one secondary storage element is connected in parallel with the electrical network.

2. The unit according to claim 1, further comprising a contactor arranged in parallel with the electric generator.

3. The unit according to claim 2, comprising a diode arranged in series with the primary storage element.

4. The unit according to claim 3, wherein the primary storage element is formed by at least one ignited electrochemical couple.

5. The unit according to claim 3, wherein the primary storage element is formed by at least one ignitable electrochemical couple.

6. The unit according to claim 5, wherein the at least one ignitable electrochemical couple includes at least one thermally ignitable electrochemical couple.

7. The unit according to claim 2, wherein the primary storage element is formed by at least one ignited electrochemical couple.

8. The unit according to claim 2, wherein the primary storage element is formed by at least one ignitable electrochemical couple.

9. The unit according to claim 1, comprising a diode arranged in series with the primary storage element.

10. The unit according to claim 9, wherein the primary storage element is formed by at least one ignited electrochemical couple.

11. The unit according to claim 9, wherein the primary storage element is formed by at least one ignitable electrochemical couple.

12. The unit according to claim 11, wherein the at least one ignitable electrochemical couple includes at least one thermally ignitable electrochemical couple.

13. The unit according to claim 1, wherein the primary storage element is formed by at least one ignited electrochemical couple.

14. The unit according to claim 1, wherein the primary storage element is formed by at least one ignitable electrochemical couple.

15. The unit according to claim 14, wherein the primary storage element is formed by at least one thermally ignitable electrochemical couple.

16. The unit according to claim 1, wherein the primary storage element is formed by a plurality of electrochemical couples arranged in series.

17. An aircraft with multi-rotor rotary wing, comprising the hybrid propulsion unit according to claim 1.

18. The unit according to claim 1, further comprising a contactor arranged in parallel with the primary storage element.

* * * * *